(12) United States Patent
Post

(10) Patent No.: US 7,078,838 B2
(45) Date of Patent: Jul. 18, 2006

(54) PASSIVE MAGNETIC BEARING FOR A MOTOR-GENERATOR

(75) Inventor: Richard F. Post, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 753 days.

(21) Appl. No.: 09/946,298

(22) Filed: Sep. 5, 2001

(65) Prior Publication Data

US 2003/0042816 A1  Mar. 6, 2003

(51) Int. Cl.
- H02K 5/16 (2006.01)
- H02K 7/09 (2006.01)
- H02K 1/00 (2006.01)
- H02K 3/00 (2006.01)

(52) U.S. Cl. .............................. 310/90.5; 310/156.01; 310/179; 310/90

(58) Field of Classification Search ............... 310/90.5, 310/90, 156.01, 179, 203, 261, 191, 156.11, 310/156.15, 156.34, 156.37, 156.54, 156.55, 310/156.53

See application file for complete search history.

(56) References Cited

U.S. PATENT DOCUMENTS

| | | | | |
|---|---|---|---|---|
| 3,176,206 A * | 3/1965 | Lund | ......................... | 318/676 |
| 3,650,581 A * | 3/1972 | Boden et al. | .............. | 310/90.5 |
| 3,845,997 A * | 11/1974 | Boden et al. | .............. | 310/90.5 |
| 4,424,463 A * | 1/1984 | Musil | ....................... | 310/49 R |
| 4,763,032 A * | 8/1988 | Bramm et al. | ............. | 310/90.5 |
| 4,774,428 A * | 9/1988 | Konecny | .................... | 310/198 |
| 4,896,063 A * | 1/1990 | Roberts | .................... | 310/68 R |
| 5,155,402 A * | 10/1992 | Bichler | ...................... | 310/90.5 |
| 5,237,229 A * | 8/1993 | Ohishi | ........................ | 310/90.5 |
| 5,302,874 A * | 4/1994 | Pinkerton | ................... | 310/90.5 |
| 5,495,221 A * | 2/1996 | Post | ........................... | 335/299 |
| 5,508,576 A * | 4/1996 | Nagate et al. | ......... | 310/156.54 |
| 5,572,079 A * | 11/1996 | Pinkerton | ................... | 310/90.5 |
| 5,705,902 A | 1/1998 | Merritt et al. | .............. | 318/254 |
| 5,777,414 A * | 7/1998 | Conrad | ...................... | 310/90.5 |
| 5,847,480 A | 12/1998 | Post | .......................... | 310/90.5 |
| 5,905,321 A * | 5/1999 | Clifton et al. | .............. | 310/178 |
| 6,111,332 A * | 8/2000 | Post | .......................... | 310/90.5 |
| 6,191,515 B1 * | 2/2001 | Post | .......................... | 310/90.5 |
| 6,353,273 B1 * | 3/2002 | Heshmat et al. | ........... | 310/90.5 |
| 6,570,285 B1 * | 5/2003 | Shinozaki | .................. | 310/90.5 |
| 6,635,976 B1 * | 10/2003 | Kanebako et al. | ......... | 310/90.5 |
| 6,641,378 B1 * | 11/2003 | Davis et al. | ............. | 417/423.7 |
| 2003/0137204 A1 * | 7/2003 | Neet | .......................... | 310/179 |

* cited by examiner

OTHER PUBLICATIONS

Klaus Halbech, "Application of permanent magnets in accelerator and electron storage rings (invited)", Journal Appl. Phys. 57, Apr. 15, 1985 pp. 3605-3608.

Primary Examiner—Darren Schuberg
Assistant Examiner—Julio Gonzalez
(74) Attorney, Agent, or Firm—Eddie E. Scott; Alan H. Thompson; James M. Skorich

(57) ABSTRACT

Conductive lap windings are interleaved with conventional loops in the stator of a motor-generator. The rotor provides magnetic induction lines that, when rotated, cut across the lap windings and the loops. When the rotor is laterally displaced from its equilibrium axis of rotation, its magnetic lines of induction induce a current in the interleaved lap windings. The induced current interacts with the magnetic lines of induction of the rotor in accordance with Lenz's law to generate a radial force that returns the rotor to its equilibrium axis of rotation.

5 Claims, 5 Drawing Sheets

US 7,078,838 B2

PASSIVE MAGNETIC BEARING FOR A MOTOR-GENERATOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to magnetic bearings and, more particularly, to a passive magnetic bearing used to support and stabilize the rotor of a motor-generator.

2. Description of Related Art

An armature and a field winding comprise the primary elements of motors, generators and alternators. In low power applications, the armature rotates through the magnetic lines of induction provided by the stationary field winding. In this configuration, the armature composes the rotor part of the assembly, while the field winding is the stator. This is the design used in automobile alternators because the stator is on the outside of the rotor, and thus can be incorporated into a protective casing to facilitate replacement of the assembly. In high-power industrial applications, the field winding usually rotates while the armature composes the stator.

Regardless of the configuration, the rotor requires a degree of freedom to rotate about is longitudinal axis. Mechanical bearings, such as journal bearings, ball bearings, and roller bearings are commonly used for this purpose. Such bearings necessarily involve friction between the rotating element and the bearing components. This reduces the efficiency of the unit, and the designer must also contend with the attendant problems of heat and wear.

Even non-contact bearings, such as air bearings, involve frictional losses that can be appreciable and, in addition, are sensitive to dust particles. Furthermore, mechanical bearings, and especially air bearings, are poorly adapted for use in a vacuum.

The use of magnetic forces to provides an attractive alternative because, as it provides for rotation without contact, it avoids the aforementioned drawbacks. One such approach uses position sensors to detect incipient unstable motion of the rotating element and then uses magnetic coils in conjunction with electronic servo amplifiers to provide stabilizing forces to restore it to its (otherwise unstable) position of force equilibrium. The foregoing is usually designated as an "active" magnetic bearing, in reference to the active involvement of electronic feedback circuitry in maintaining stability.

Less common than the servo-controlled magnetic bearings just described are magnetic bearings that use superconductors to provide a repelling force acting against a permanent magnet element in such a way as to levitate that magnet. These bearing types utilize the flux-excluding property of superconductors to maintain a stable state by appropriately shaping the superconductor and the magnet to provide restoring forces for displacements in any direction from the position of force equilibrium. Obviously, magnetic bearings that employ superconductors must keep the superconductor at cryogenic temperatures, and this comprises a significant consideration for any design incorporating this type of bearing.

As may be seen from the foregoing, there presently exists a need in the art for a bearing that avoids the shortcomings and problems attendant to using mechanical bearings, but does so without the drawbacks and design limitations associated with active or superconducting magnetic bearings. The present invention fulfills this need in the art.

SUMMARY OF THE INVENTION

Conductive lap windings are interleaved with conventional loops in the stator of a motor-generator. The rotor provides magnetic induction lines that, when rotated, cut across the lap windings and the loops. When the rotor is laterally displaced from its equilibrium axis of rotation, its magnetic lines of induction induce a current in the interleaved lap windings. The induced current interacts with the magnetic lines of induction of the rotor in accordance with Lenz's law to generate a radial force that returns the rotor to its equilibrium axis of rotation.

DETAILED DESCRIPTION OF THE INVENTION

Figure 1:
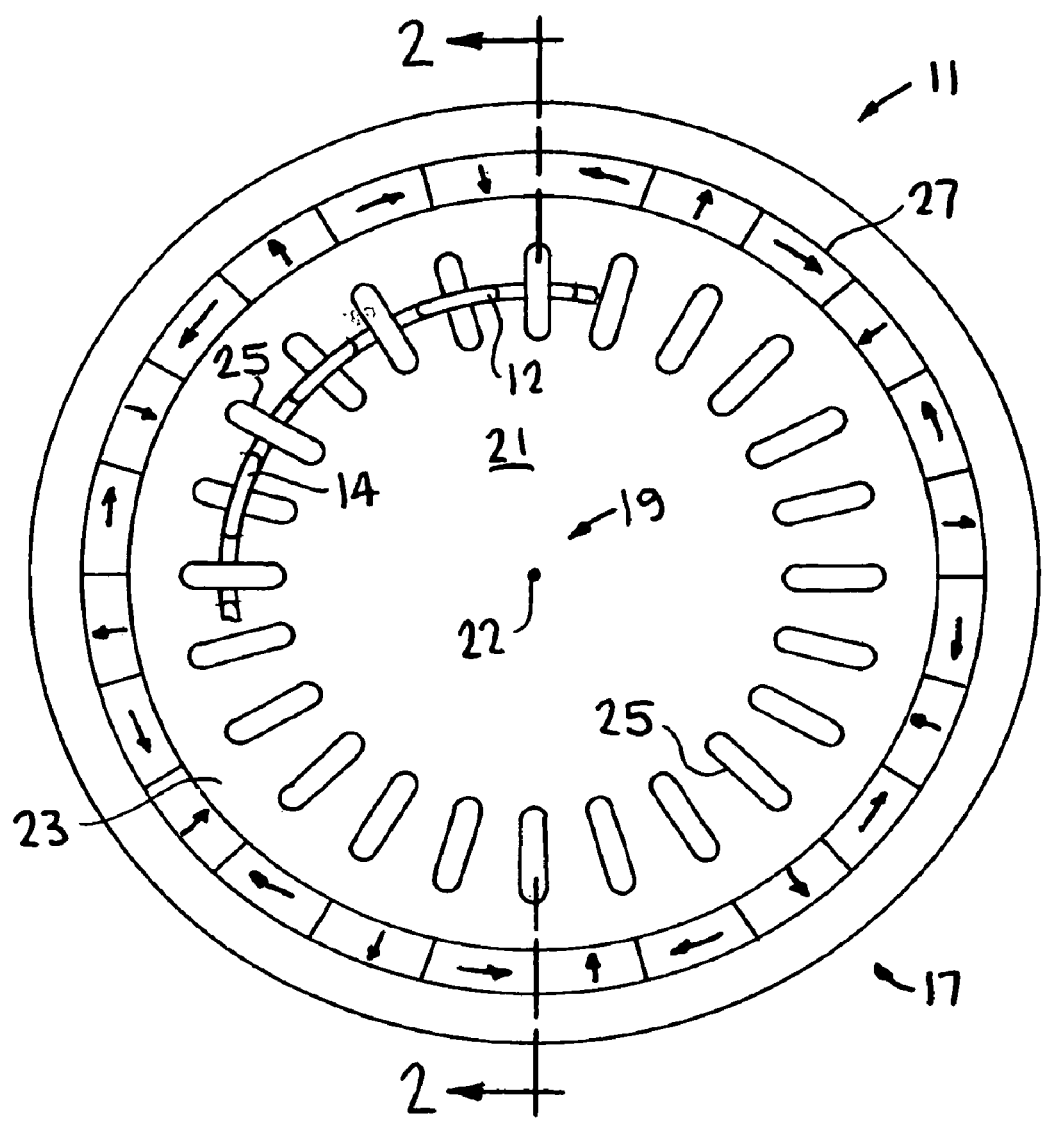
FIG. 1 is a section front view of a motor-generator that includes the passive magnetic bearing of the present invention.

Turning to the drawings, FIG. 1 is a section front view of motor-generator 11 including conductive lap windings 12, 13, 14 and 15 of the present invention. Motor-generator 11 also includes rotor 17 rotating its longitudinal axis of symmetry 19 and around stator 21. As shown in FIG. 1, when rotor 17 is in equilibrium, axis 19 is collinear with longitudinal axis of symmetry 22 of stator 21. Radial gap 23 separates rotor 17 and stator 21. Gap 23 is uniform and cylindrical when rotor 17 is in its equilibrium position, and becomes asymmetrical when rotor 17 is displaced therefrom.

Figure 2:
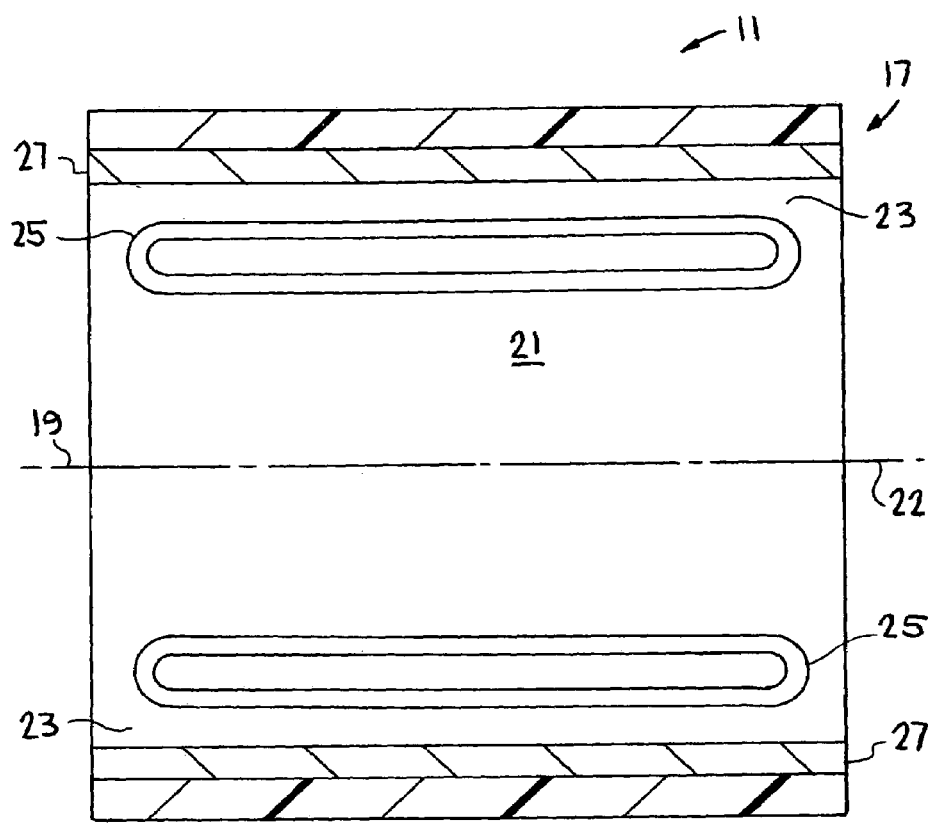
FIG. 2 is a section side view of the motor-generator that includes the passive magnetic bearing of the present invention, taken along line 2—2 of FIG. 1.

As also shown in FIG. 2, a section view taken along line 2—2 of FIG. 1, stator 21 includes conductive rectangular loops 25. Rotor 17 includes annular Halbach magnet array 27 that generates a magnetic field radially inward towards axis 19, having lines of induction that intersect lap windings 12, 13, 14 and 15, and loops 25. A discussion of Halbach magnet arrays is provided in K. Halbach, "Application of Permanent Magnets in Accelerators and Electron Storage Rings," *Journal of Applied Physics,* Vol. 57, Apr. 15, 1985, pp. 3605–3608, which is hereby incorporated by reference.

Omitted from the drawings is the structure of stator 21 that supports loops 25, and the circuitry of stator 21 connecting loops 25 to either an external circuit to apply the voltage output generated by motor-generator 15, or to a voltage source to drive motor-generator 15. The foregoing structure and circuitry are well known to those skilled in the electromechanical arts.

Figure 4:
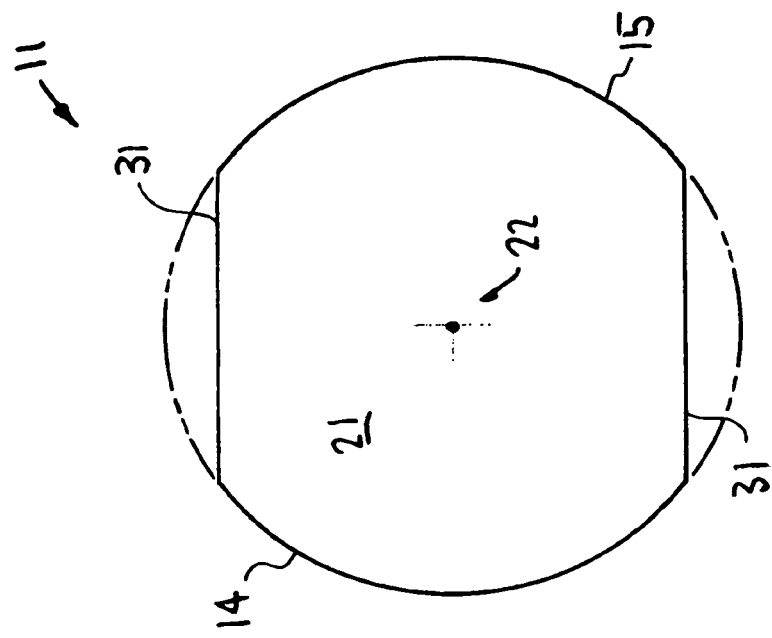
FIG. 4 is a front view of the motor-generator that includes the passive magnetic bearing of the passive magnetic bearing showing only the lap windings and connecting wire of the passive magnetic bearing for the side quadrants of the stator.
Figure 3:
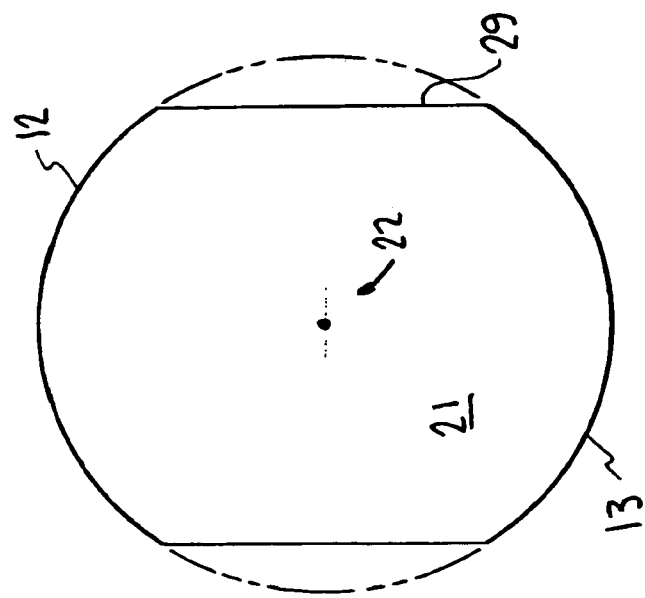
FIG. 3 is a front view of the motor-generator that includes the passive magnetic bearing of the present invention, showing only the lap windings and connecting wire of the passive magnetic bearing for the top and bottom quadrants of the stator.

Lap windings 12, 13, 14, and 15 are interleaved with loops 25. FIG. 3 shows a front view of motor-generator 11 with lap windings 12 and 13, and wires 29 shown with solid lines, and the outline of stator 21 shown in phantom. Lap winding 12 is interleaved across the top quadrant of stator 21 and lap winding 13 is interleaved across the bottom quadrant of stator 21. Wires 29 electrically connect lap windings 12 and 13 to form a closed circuit. FIG. 4 shows a front view of motor-generator 11 with lap windings 14 and 15, and wires 31 shown with solid lines, and the outline of stator 21 shown in phantom. Lap winding 14 is interleaved across the quadrant on one side of stator 21, and lap winding 15 is interleaved across the quadrant on the other side. Wires 31 electrically connect lap windings 14 and 15 to form a closed circuit.

Figure 5:
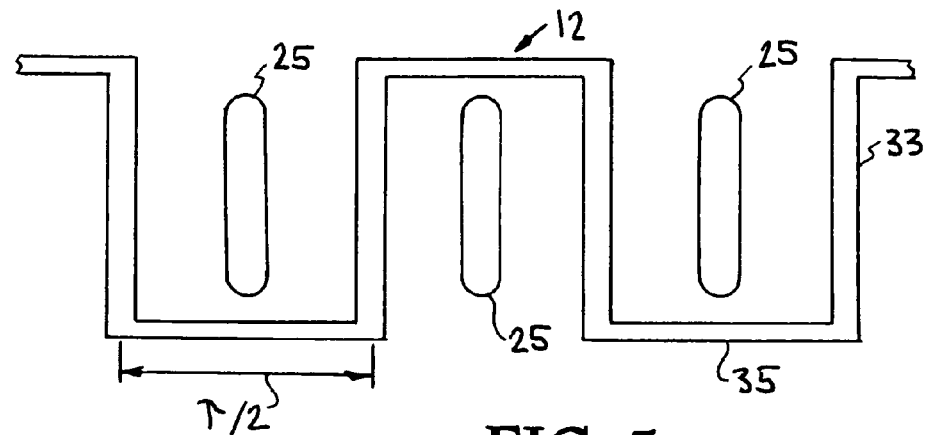
FIG. 5 is a top view of the stator showing only the loops and interleaved lap winding of the passive magnet bearing for the top quadrant of the stator.

FIG. 5 is a top view of lap winding 12 interleaved with loops 25 across the top quadrant of stator 21. Lap winding 12 is composed of parallel lateral sections 33 and longitudinal sections 35. Longitudinal sections 35 space lateral sections 33 azimuthally apart from one another by one-half of the wavelength, λ, of the lines of induction emanating from the multiple poles of Halbach array 27. Lap winding 13 is aligned with lap winding 12; that is, each singular lateral section 33 and longitudinal section 35 for lap winding 12 lies in a vertical plane containing the same respective section for lap winding 13. Similarly, lap winding 14 is aligned with lap winding 15.

Figure 6:
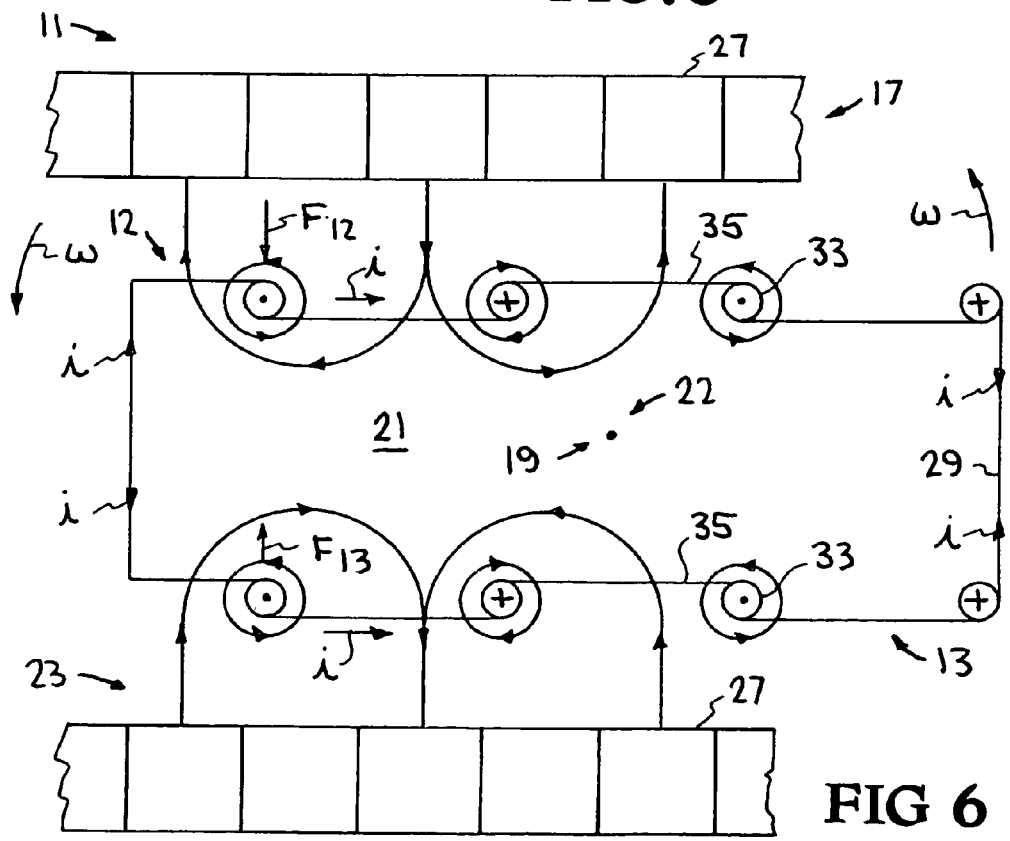
FIG. 6 is a schematic drawing showing the top and bottom quadrants of the passive magnetic bearing when the rotor is in the equilibrium position.

FIG. 6 is a schematic drawing showing the interaction between the lines of induction of Halbach array 27 and lap windings 12 and 13, to induce vertical centering forces that act upon the top and bottom quadrants of stator 21. More particularly, as Halbach array 27 rotates counterclockwise around axis of symmetry 19 at angular velocity ω, a current, i, is induced in both lap winding 12 in the top quadrant of stator 21 and in lap winding 13 in the bottom quadrant.

When rotor 17 is rotating in equilibrium, axis of symmetry 19 is collinear with axis of symmetry 22 of stator 21 and gap 23 is uniform about the inner circumference of Halbach array 27. The magnetic fields moving across lap windings 12 and 13 are of equal strength, and are phased so as to induce an equal time-varying current, i, in lap winding 12 and lap winding 13. Since lap windings 12 and 13 are connected in opposing series to form a circuit by wires 29, the net current flowing through the circuit is zero and thus the net induced force is zero.

However, if rotor 17 is transversely displaced relative to axis 22 of stator 21, gap 23 will become asymmetrical. The strength of the magnetic field of Halbach array 27 increases exponentially as gap 23 decreases. Thus the field strength acting on lap windings 12 and 13 will differ, and this will induce a net current, i, through the circuit comprised of lap windings 12 and 13, and wires 29. In accordance with Lenz's law, the cross product of the net current, i, and the lines of induction will result in a radial force $F_{12}$ acting on lap winding 12 and a radial force $F_{13}$ acting on lap winding 13. Both $F_{12}$ and $F_{13}$ will be in the same direction as the displacement of rotor 17. Equal and opposing reactive forces will act against rotor 17, i. e., in the opposite direction as the displacement of rotor 17, until gap 23 becomes symmetrical, i. e., when rotor 17 reaches its equilibrium position.

Figure 7:
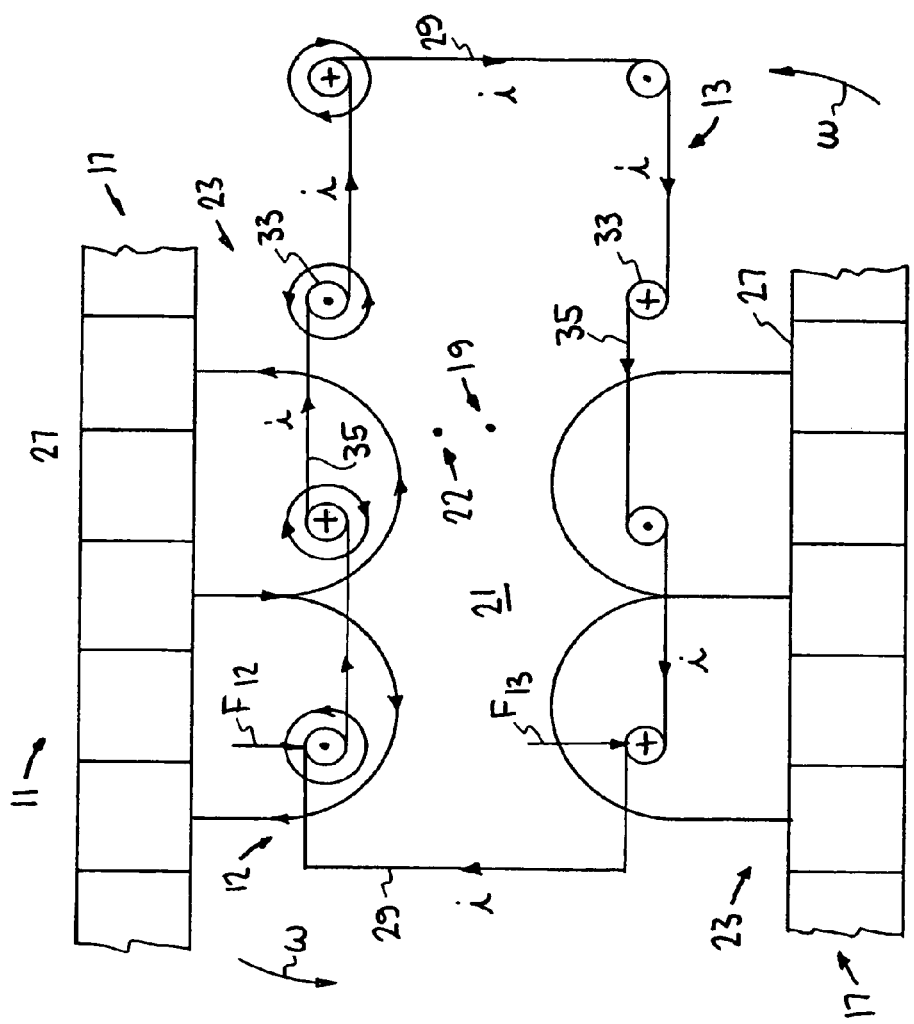
FIG. 7 is a schematic drawing showing the top and bottom quadrants of the passive magnetic bearing when the rotor is displaced downward from the equilibrium positions.

Referring to the example shown in FIG. 7, if rotor 17 is displaced downward relative to stator 22, gap 23 will be less for the top quadrant of stator 21 than for the bottom quadrant. As the strength of the magnetic field affecting lap winding 12 will be greater than that affecting lap winding 13, a clockwise current, i, will be induced throughout the closed circuit. The cross product of i and the lines of induction acting on lap windings 12 and 13 will induce forces $F_{12}$ and $F_{13}$ acting downwardly against lap windings 12 and 13, respectively. Equal and opposing reactive forces will act upwardly on rotor 17 until it is returned to its equilibrium position, with axis 19 lying collinear with axis 22.

The same analysis is applicable to lap windings 14 and 15. They will interact in an identical manner with the magnetic field of Halbach array 27 to generate a centering force to restore rotor 17 to its equilibrium position when it undergoes a horizontal transverse displacement therefrom.

By making the angular width in the azimuthal direction of lap windings 14 and 15 unequal to the angular width of lap windings 12 and 13, anisotropic stiffness could be introduced. That is, because of the difference in the azimuthal extent of the windings, the magnitude of the reactive force, or stiffness, for restoring a horizontal displacement to the equilibrium position, would be different from that of restoring a vertical displacement to the equilibrium position. Anisotropic stiffness is known to provide a stabilizing effect against rotor-dynamic instabilities.

It is to be understood, of course, that the foregoing description relates only to an embodiment of the invention, and that modification to that embodiment may be made without departing from the spirit and scope of the invention as set forth in the following claims.

The invention claimed is:

1. An apparatus for restoring a rotor to an equilibrium position having an axis of rotational equilibrium comprising:

the rotor for rotating on an axis of rotation around a stator;

the rotor including a Halbach array of magnets;

the stator including conductive loops and lap windings, wherein said lap windings are interleaved with said conductive loops;

a space in between the Halbach array and the stator;

the space being radially symmetrical when the axis of rotation is collinear with the axis of equilibrium and being asymmetrical when the axis of rotation is displaced from the axis of equilibrium;

rotation of the Halbach array relative to the lap windings inducing a net current in said conductive loops and in said lap windings and generating a restorative force acting on the rotor when the spacing is asymmetrical, tending to restore the axis of rotation to collinearity with the axis of equilibrium, wherein:

the lap windings include parallel lateral sections that lie parallel to the axis of equilibrium;

the restorative force being reactive to an induced force acting on the parallel lateral sections; and the induced force being induced by rotation of the Halbach array around the stator.

2. The restoring apparatus as defined in claim 1 wherein:

the restorative force includes a component acting vertically that is reactive to the induced force acting on a first pair of diametrically opposed sets of lap windings;

each set of the first pair is symmetrically disposed about a vertical plane that includes the axis of equilibrium; and each set of the first pair is electrically connected in series to form a first closed circuit.

3. The restoring apparatus as defined in claim 2 wherein:

the restorative force includes a component acting horizontally that is reactive to the induced force acting on a second pair of diametrically opposed sets of lap windings;

each set of the second pair is symmetrically disposed about a horizontal plane that includes the axis of equilibrium; and each set of the second pair is electrically connected in series to form a second closed circuit.

4. The restoring apparatus as defined in claim 3 wherein:

each set of the first pair is spaced a first distance apart;

each set of the second pair is spaced a second distance apart; and said first distance is unequal to said second distance, whereby the rotor is restored to the equilibrium position with an anisotropic stiffness.

5. The restoring apparatus as defined in claim 3 wherein the parallel lateral sections are connected by longitudinal sections lying normal to the parallel lateral sections.

* * * * *